United States Patent [19]

Paulsen

[11] 3,985,333

[45] Oct. 12, 1976

[54] SOLENOID VALVE

[75] Inventor: Gary Allen Paulsen, St. Charles, Ill.

[73] Assignee: Spraying Systems Co., Wheaton, Ill.

[22] Filed: Sept. 2, 1975

[21] Appl. No.: 609,556

[52] U.S. Cl. ............................. 251/129; 251/282
[51] Int. Cl.² ....................................... F16K 31/06
[58] Field of Search ............................ 251/282, 129

[56] References Cited
UNITED STATES PATENTS

| | | | |
|---|---|---|---|
| 2,826,215 | 3/1958 | Wolfslau et al. | 251/282 X |
| 3,304,048 | 2/1967 | Roberts | 251/282 X |
| 3,414,231 | 12/1968 | Kreuter | 251/282 X |

FOREIGN PATENTS OR APPLICATIONS

| | | | |
|---|---|---|---|
| 1,267,295 | 6/1961 | France | 251/282 |

*Primary Examiner*—Arnold Rosenthal
*Attorney, Agent, or Firm*—Mann, Brown & McWilliams

[57] ABSTRACT

This invention relates to a solenoid valve primarily intended for association with agricultural equipment and provides a balanced valve for controlling the spraying of fluids wherein the armature is separated from the fluid and which requires minimum electrical power for actuation because of a balanced seat design so that the force acting on the valve stem due to fluid pressure is zero. Consequently, only a relatively small external force is required to move the stem and a small coil can be utilized to operate the valve.

7 Claims, 3 Drawing Figures

SOLENOID VALVE

BACKGROUND OF THE INVENTION

Agricultural spray equipment normally has used manually actuated valves to turn the spray booms on and off and sprayers of this type usually are pulled by a typical farm tractor. Some may be integrated with specially designed machines which do nothing but spray various chemicals on large acreages. Farm equipment of this general type is constantly being improved and becomes ever more sophisticated. Greater operator comfort is a constant objective and is designed into all new equipment.

Cab equipped spray apparatus have had control valves and related hoses inside the cab and this has created a potentially hazardous situation for the operator since the inside of the cab would be drenched very quickly with the chemicals being sprayed if for any reason the valves or hoses so located should fail. Some of the chemicals used are toxic and could cause severe injury to the operator and to avoid this or reduce the hazard to a minimum the valves and hose connections should be located away from the operator and preferably outside the cab. Solenoid valves offer a convenient way to accomplish this.

However, solenoid valves presently available for use on agricultural sprayers appear to be nothing more than typical industrial valves adapted to the extent necessary for application to the agricultural equipment. The only alternative made in such adaptation usually comprises exchanging the industrial coil for one compatible with automotive type electrical systems. Generally such solenoids are of the normally closed internal pilot operated type and use the system pressure to assist in opening and closing the valve.

Such pilot operated valves typically have a relatively large diameter diaphragm containing two small holes. One hole in the center of the diaphragm is larger than the other which is located nearer the outside perimeter of the diaphragm. A metal armature, which controls the operation of the valve, seats on the center hole and when electrical power is applied the armature moves off of the center hole to allow fluid to flow through the valve. Because the center hole is larger than the outer hole a pressure differential is created across a large area of the diaphragm and the resultant force lifts the diaphragm off of the main seat and allows full flow through the valve. When power is cut off the spring loaded armature is forced to seat on the center hole. The spring force continues to return the diaphragm toward the main seat so that the flow through the valve becomes restricted and a pressure differential is created. This forces the diaphragm into engagement with the main seat thus stopping all flow. Because the armature acts only to control a small area the force created by the coil can by small and therefore a relatively small coil can be utilized to control a large fluid flow.

However, this type of solenoid valve has certain disadvantages. The armature is immersed in the fluid and therefore the armature material must be coated or protected so that it will not be attached by the fluid. The clearances between the armature and the tube in which it moves are small and consequently any insoluble foreign matter such as sand, rust chips, or the like, will cause armature to bind. The fluid velocity on the armature side of the diaphragm is very low and wettable powder solutions commonly used in agricultural applications have a tendency to settle out in this area and restrict the motion of the armature. A minimum pressure differential often is required to open and close the valve fully. A direct acting valve might be used to reduce these problems to a minimum but such valve, having the same flow capabilities as a pilot operated valve, would require a very large coil and the power required for such a coil is so great as to make it impractical due to the fact that sufficient force must be developed to overcome the load created by the pressure acting on the entire seating area.

SUMMARY OF THE INVENTION

The solenoid valve of the present invention overcomes these prior difficulties and provides a valve that minimizes electrical power requirements, separates the armature from the fluid, has large internal areas to resist clogging and is direct acting. With this valve the force acting on the stem due to fluid pressure is zero. The design of the valve is such that the balanced seat arrangement minimizes the power requirement and only a small external force is required to move the stem. Consequently, a relatively small coil can be used to operate the valve. Balancing is accomplished by providing a seal on either side of the seat and both of these seals and the seat have the same effective area so that when the valve is shut off the lower seal area and the seat area are equal. Pressure acting on these areas creates equal forces on the stem acting in opposite directions. These forces cancel each other so that the net force acting on the stem is zero. If pressure is retained in the chamber on the outlet side of the seat a similar set of conditions will exist with the upper seal area and the seat area being equal. Any pressure will create forces on the stem which will cancel each other. With the valve open the two sealed areas are equal and again the forces cancel leaving a zero net force on the stem.

OBJECTS OF THE INVENTION

It is the primary purpose of this invention to provide a solenoid valve for use on agricultural equipment and especially for mounting on a tractor drawn spray rig remote from the tractor and operator's cab.

The principal object of the invention is to provide a solenoid actuated from the electrical system of a tractor or other agricultural machine and which requires but minimum electrical power for actuation.

An important object of the invention is the provision of a solenoid valve of balanced design wherein opposite forces cancel each other to provide a net force of zero acting on the valve stem.

Another object of the invention is to provide a solenoid valve for the handling of fluids and having large internal areas to prevent clogging and wherein the armature is separated from the fluids.

A further object of the invention is the provision of a direct acting solenoid utilizing a relatively small coil to operate the valve whereby a relatively small external force is required to actuate the valve stem.

A more specific object of the invention is to provide a solenoid valve having a seal on both sides of the seat wherein the seals and the seat have the same effective area so that pressures acting on these areas create equal forces on the stem acting in opposite directions and these forces cancel each other to provide a net force of zero acting on the stem both in the opened and closed positions of the valve.

DESCRIPTION OF THE DRAWINGS

The foregoing and other and more specific objects of the invention are attained by the solenoid valve construction and arrangement illustrated in the accompanying drawings wherein.

DESCRIPTION OF PREFERRED EMBODIMENT

Figure 1:
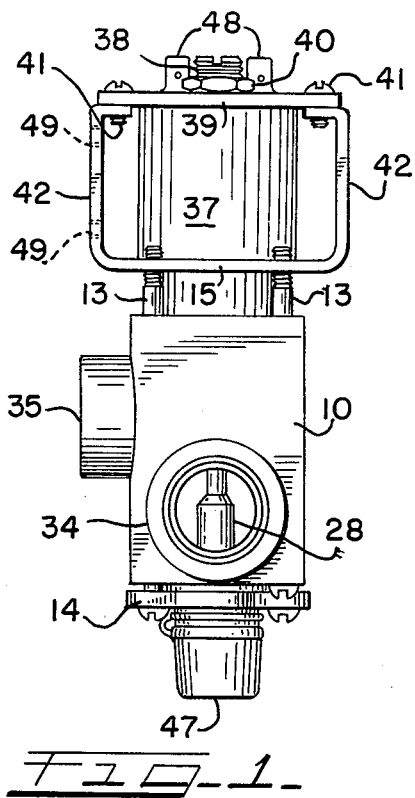
FIG. 1 is a side elevational view of the solenoid operated valve arrangement.
Figure 2:
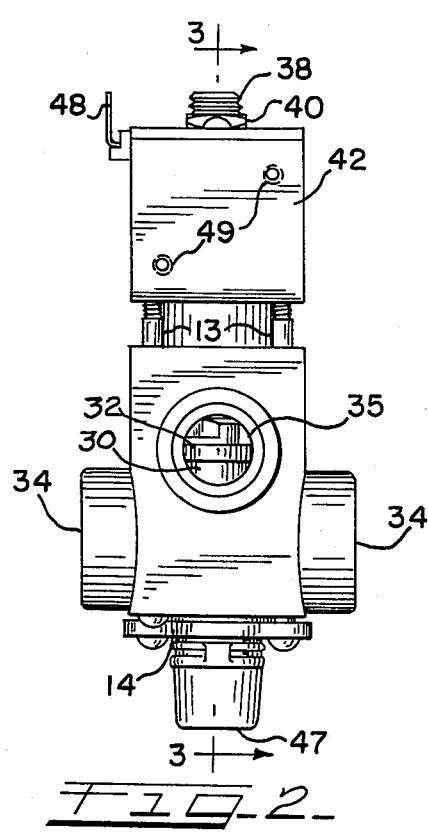
FIG. 2 also is a side elevational view of the solenoid valve showing a side of the valve 90 degrees from that illustrated in FIG. 1.
Figure 3:
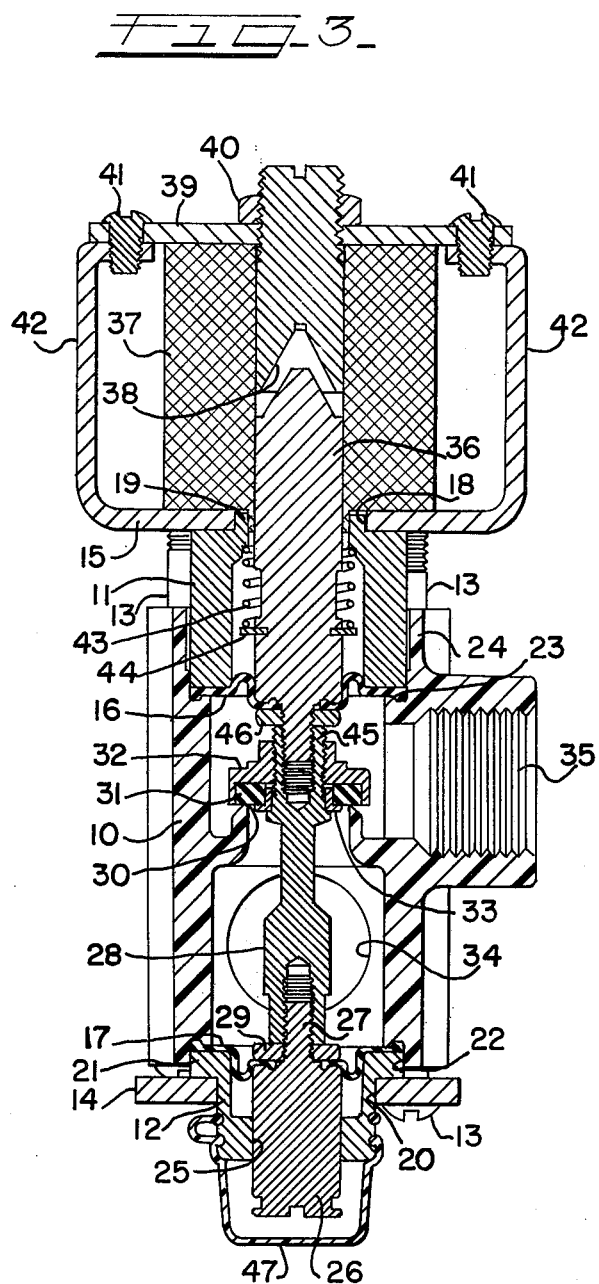
FIG. 3 is a vertical sectional view through the solenoid valve taken on the line 3—3 of FIG. 2.

In the drawings the solenoid valve assembly is shown as having a valve body 10 which in the form disclosed is formed from polypropylene. An upper diaphragm housing 11 and a lower diaphragm housing 12 are disposed above and below the valve body respectively and are secured by screws or bolts 13 at least two of which extend through a bottom plate 14 and are threaded into a strap member 15 at the top. Upper diaphragm 16 and lower diaphragm 17 are clamped between the respective housings 11 and 12 and the valve body 10. The top strap member 15 and the bottom plate 14 draw the respective housings 11 and 12 into engagement with the respective diaphragms 16 and 17 under the action of the screws 13 to provide the clamping action around the perimeter of the diaphragms.

The top strap member 15 is disposed on the housing 11 and is provided with a centrally disposed opening 18 engaged around an upstanding flange 19 on the housing. The bottom plate 14 is provided with a centrally disposed opening 20 engaged around the body of the lower diaphragm housing 12 and the plate engages a clamping flange 21 on the housing which applies the clamping pressure to the diaphragm 17. The diaphragm 17 is recessed into the lower end of the valve body 10 as at 22 and the flange 21 fits into this recess when the diaphragm is clamped into position. The upper housing 11 engages the diaphragm 16 directly and it will be noted that this diaphragm is relatively deeply seated in the valve body as at 23 with an upstanding flange 24 on the body surrounding the housing for a substantial portion of its depth.

The bottom housing 12 is provided with a centrally disposed opening 25 and a lower diaphragm piston 26 is vertically reciprocable through this opening. The piston 26 is provided with a threaded extension 27 extending upwardly through a central hole in the diaphragm 17 and is threaded into a vertical valve stem 28 with a washer 29 disposed between the bottom end of the stem and the diaphragm 17 and when the piston 26 is tightened into the stem 28 a clamping action is exerted on the central area of the diaphragm by the washer 29. The valve stem 28 extends upwardly through the area of the valve seat 30 and at the upper side of the valve seat includes a valve in the form of a non-metallic seat washer 31, of rubber or the like, mounted on the stem in properly related position to engage the seat 30 in the closed position of the valve. The upper end of the valve stem 28 is threaded externally as well as internally and a seat washer retainer 32 is secured on the external threads. The seat washer 31 is clamped between the retainer 32 and a flanged spacer 33 mounted on the stem and supported by a shouldered projection on the stem which takes the reaction of the clamping force as the retainer 32 is tightened down on the external threads of the stem with the bottom surface of the washer 31 exposed for engagement with the seat 30.

The valve body 10 is provided with one or more inlet openings 34 below the valve seat area and an outlet opening 35 above the valve seat so that the valve action of seat 30 and seat washer 31 effectively controls the flow of fluids through the valve body and it will be noted that the passages throughout the body portion are ample and sufficiently clear and open to prevent any likelihood of the valve becoming clogged. The valve is electrically actuated and for this purpose an armature 36 extends through the upper diaphragm housing 11 and is surrounded by a coil 37 which actuates the armature. An armature stop 38 limits the maximum upward movement of the armature. This stop 38 is mounted on a coil cover plate 39 and is adjustably mounted therein by means of a threaded connection through a centrally disposed opening in the plate and secured by a locking nut 40. The coil cover 39 is secured by screws 41 to inwardly directed flanges on upstanding walls 42 which are integral with the strap member 15. An armature spring 43 surrounds the armature 36 and engages a retaining ring 44 at its lower end which ring is mounted on the armature. The upper end of the spring bears against the underside of the top wall of the upper housing 11 so that the thrust of the spring 43 on the armature is downward.

The armature 36 at its lower end is provided with a threaded extension 45 projecting downwardly through a central opening in the upper diaphragm 16 and is secured in the upper end of the valve stem 28 by engagement with the internal threads in that area of the stem. A washer 46 is disposed on the armature extension 45 and the diaphragm 16 is clamped between this washer and the bottom end of the armature 36 when the threaded connection of the armature and valve stem 28 is tightened. Thus, the diaphragms 16 and 17 are disposed upon the opposite sides of the valve seat 30 and stem 28 provides a rigid connection of fixed length between the diaphragms while the central armature 36 and a lower piston 26 afford an axial guiding action. The diaphragm piston 26 is covered by a flexible cover 47 snapped into place over the lower diaphragm housing 12 to enclose the piston 26 and which can be readily removed for access to the piston and by means of which the valve stem 28 can be moved manually.

The coil 37 is Nylon encapsulated and provided with spade connections 48 for making electrical connections with a source of electrical power. Electrical operation of this control valve from the tractor's electrical system enables the solenoid actuated valve to be remotely located outside the operator's cab and there would only be the necessary electrical connections and switches or the like near the person operating the tractor and controlling the operation of a spray rig from the cab. The valve might be located on the spray rig or in the most advantageous position to reduce the length and number of hoses to a minimum and thus lower costs. After the initial installation subsequent hook-ups on a trailing rig could be completed merely by making the electrical connection to render the control valve ready for operation. The coil 37 can be removed without dismounting the control valve by removing the cover plate 39 which renders the coil accessible and enables it to be lifted out of the top strap bracket 15 without disturbing any part of the valve assembly therebelow. The entire valve assembly can be mounted on the agricultural equipment as desired by means of the threaded bolt holes 49 in one of the upstanding walls 42 of the strap bracket 15. The electrical terminals 48 can be located at either of the two open sides of the bracket 15 merely by turning the coil in the bracket as desired.

All of the internal parts of this valve which may come in contact with fluids handled by the valve are of stainless steel. The stem 28 is of stainless steel as are the washers 29 and 46, the retainer 32 and the spacer 33. The lower piston 26 also is of stainless steel and the bottom diaphragm housing 12 is of stainless steel. The upper diaphragm housing 11 is made from steel and electroless-nickel plated. The armature 26, armature stop 38 and the locking nut 40 also are all made from steel and electroless-nickel plated. The coil cover plate 39, the strap bracket 15 including the upright walls 42 and the bottom plate 14 are all made from steel and protectively coated with epoxy paint.

In the operation of this valve it will be seen that with the valve in the open position the valve seat 30 will no longer have any effect on the movement of the valve stem 28. The pressure present will now act on both sides of the seat and any forces created will therefore cancel each other. The seal areas represented by the upper and lower diaphragms 16 and 17 are equal and pressure acting on these diaphragms will create equal forces acting in opposite directions so that they cancel each other and the net force acting on the valve stem 28 is zero. Therefore, whether the valve is open or closed, if there is pressure on either or both sides of seat 30, only a small force is required to move the valve stem up or down.

The coil 37 is relatively small and when energized supplies the small external force necessary to open the valve. The valve is closed by the action of the relatively light spring 43 which returns the armature 36 and the valve stem 28 with the seat washer 31 to engage the seat 30 and thus close the valve. The valve is direct acting. The armature and stem are securely attached to each other thus affording a rigid assembly so that when the armature moves the entire valve stem moves with it and because of this the valve is not dependent upon any minimum operating pressure. The valve's operation is such that the valve will fully open or close at zero pressure.

All chambers and passages in the fluid handling areas of this valve are large and open so that the design provides a valve highly resistant to clogging and wherein powder solutions will not settle out and adversely affect the performance of the valve. The diaphragm seals 16 and 17 are rolling diaphragm seals so that there is no relative sliding motion between the sealing members and therefore wear resulting from friction is practically non-existent. The armature 36 atteched to the upper end of the valve stem 28 and working inside the coil 37 is separated from the fluids passing through the valve by the diaphragm seal 16 and because it is thus not immersed any possibility of corrosion due to the fluid is prevented.

From the foregoing it will be seen that a solenoid valve especially adapted for use with agricultural equipment has been provided wherein the valve is of balanced design whereby forces acting on the valve stem due to fluid pressure are zero enabling the valve to be actuated by a relatively small force requiring but a small coil for normal operation of the valve and wherein the armature is rigid with the valve stem but separated from the fluids handled through the valve.

What is claimed is:

1. A solenoid operated valve including a valve body having inlet and outlet passages communicating with the interior of the valve body upon the opposite sides of a valve seat, a valve enclosed by the valve body operably associated with said valve seat, a valve stem connected with said valve, an armature axially aligned and rigidly connected with said valve stem, an electrically energized coil surrounding said armature and moving said valve relative to said seat, diaphragm seals of equal area sealing the interior of the valve body at the top and bottom sides respectively of said passages, upper and lower diaphragm housings secured to said valve body and clamping said respective diaphragm seals about their perimeters between the housings and the upper and lower ends of said body, said armature reciprocating axially through said upper diaphragm housing and said lower diaphragm piston reciprocating axially through said lower diaphragm housing, a removable cover enclosing the bottom end of said piston, a bottom plate mounted on said lower diaphragm housing, and said bottom plate, lower housing, valve body and said upper diaphragm housing being secured together by a common connecting means.

2. A solenoid operated valve as set forth in claim 1 wherein a lower diaphragm piston is axially aligned with and rigidly secured to the lower end of said valve stem, and said diaphragm seals are clamped respectively through their central areas between said armature and the valve stem and between said lower diaphragm piston and the valve stem.

3. A solenoid operated valve as set forth in claim 2 wherein a spring is mounted in said upper diaphragm housing engaging said armature, said coil when energized moving the armature in one direction and said spring when the coil is deenergized moving the armature in the opposite direction.

4. A solenoid operated valve including a valve body having inlet and outlet passages communicating with the interior of the valve body upon the opposite sides of a valve seat, a valve enclosed by the valve body operably associated with said valve seat, a valve stem connected with said valve, an armature axially aligned and rigidly connected with said valve stem, an electrically energized coil surrounding said armature and moving said valve relative to said seat, diaphragm seals of equal area sealing the interior of the valve body at the top and bottom sides respectively of said passages, upper and lower diaphragm housings secured to said valve body and clamping said respective diaphragm seals about their perimeters between the housings and the upper and lower ends of said body, a lower diaphragm piston axially aligned with and rigidly secured to the lower end of said valve stem, said diaphragm seals being clamped respectively through their central areas between said armature and the valve stem and between said lower diaphragm piston and the valve stem, a spring mounted in said upper diaphragm housing engaging said armature, said coil when energized moving the armature in one direction and said spring when the coil is deenergized moving the armature in the opposite direction, an enclosing bracket supporting said coil, a cover plate overlying and removable secured to said bracket, and an armature stop axially aligned with said armature secured on said coverplate.

5. A solenoid operated valve as set forth in claim 4 wherein said armature reciprocates axially through said upper diaphragm housing and said lower diaphragm piston reciprocates axially through said lower diaphragm housing, and a removable cover on the lower diaphragm housing enclosing the bottom end of said piston.

6. A solenoid operated valve as set forth in claim 5 wherein a bottom plate is mounted on said lower diaphragm housing and said bottom plate, lower housing, valve body, upper diaphragm housing and said enclosing bracket are secured together by a common connecting means.

7. A solenoid operated valve as set forth in claim 6 wherein said valve body is made from polypropylene, said valve stem, said lower piston and said bottom diaphragm housing being made from stainless steel, said upper diaphragm housing, said armature and said armature stop comprising electroless-nickel plated steel, and said coil being nylon encapsulated.

* * * * *